United States Patent
Oshima et al.

(10) Patent No.: US 7,251,859 B2
(45) Date of Patent: Aug. 7, 2007

(54) HINGE DEVICE

(75) Inventors: Kazuyoshi Oshima, Naruto-machi (JP); Shinichiro Koshikawa, Yokaichiba (JP); Katsuya Imai, Tako-machi (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 166 days.

(21) Appl. No.: 10/516,064

(22) PCT Filed: May 21, 2003

(86) PCT No.: PCT/JP03/06364

§ 371 (c)(1),
(2), (4) Date: Nov. 29, 2004

(87) PCT Pub. No.: WO03/102433

PCT Pub. Date: Dec. 11, 2003

(65) Prior Publication Data

US 2005/0160557 A1   Jul. 28, 2005

(30) Foreign Application Priority Data

May 31, 2002  (JP)  ............................ 2002-158768

(51) Int. Cl.
*E05D 11/10* (2006.01)
(52) U.S. Cl. .......................................... 16/330; 16/303
(58) Field of Classification Search ............... 16/330, 16/303, 321, 307, 342 X, 334, 277, 319, 16/297; 379/433.12, 433.13; 348/373, 333.06, 348/794; 455/575.1, 575.4, 575.8, 550.1, 455/90.3; 248/919–923; 361/680–683
See application file for complete search history.

(56) References Cited

U.S. PATENT DOCUMENTS 4,043,798 A * 8/1977 Nashiwa et al. .............. 420/84

(Continued)

FOREIGN PATENT DOCUMENTS

JP          10317779 A  *  12/1998

(Continued)

OTHER PUBLICATIONS

Patent Abstracts of Japan, publication No. 2002-106544, publication date Apr. 10, 2002.

(Continued)

*Primary Examiner*—Chuck Y. Mah
(74) *Attorney, Agent, or Firm*—Osha Liang LLP

(57) ABSTRACT

A hinge pin 6 is turnably inserted in a through hole 22 formed in a first hinge member 2. A second hinge member 3 is fixed to the hinge pin 6. A movable member 7 is connected to the first hinge member 2 such that said movable member 7 is non-turnable but movable in the axial direction. A convex part 75 is formed on the movable member 7. A concave part 53 is formed in a fixing member 5 of the second hinge member 3. By pressing the convex part 75 against a bottom surface 53a of the concave part 53 under the biasing force of a coiled spring 8, the biasing force of the coiled spring 8 can be converted to a turn biasing force for turning the second hinge member 3 with respect to the first hinge member 2. The hinge pin 6 is press-fitted in the through-hole 22 of the first hinge member 2. This causes to generate a frictional resistance for preventing relative rotation between the first hinge member 2 and the second member 3, between the inner peripheral surface of the through-hole 22 and the outer peripheral surface of the hinge pin 6. This frictional resistance is set to be smaller than the turn biasing force caused by the coiled spring 8.

6 Claims, 13 Drawing Sheets

U.S. PATENT DOCUMENTS

| | | | |
|---|---|---|---|
| 5,109,571 A * | 5/1992 | Ohshima et al. | 16/307 |
| 5,600,868 A * | 2/1997 | Tourville et al. | 16/277 |
| 6,070,298 A * | 6/2000 | Sorimachi | 16/330 |
| 6,115,886 A * | 9/2000 | Fujita | 16/330 |
| 6,175,990 B1 * | 1/2001 | Kato et al. | 16/334 |
| 6,305,050 B1 * | 10/2001 | Imai | 16/303 |
| 6,785,936 B2 * | 9/2004 | Koshikawa | 16/328 |
| 6,832,411 B2 * | 12/2004 | Koshikawa et al. | 16/330 |
| 2003/0014840 A1 * | 1/2003 | Huong | 16/330 |
| 2005/0120515 A1 * | 6/2005 | Kato | 16/221 |

FOREIGN PATENT DOCUMENTS

| | | | |
|---|---|---|---|
| JP | 2001-124051 A | | 5/2001 |
| JP | 2001-193727 A | | 7/2001 |
| JP | 2001-317537 A | | 11/2001 |
| JP | 2002-106544 A | | 4/2002 |
| JP | 2002-250332 A | | 9/2002 |
| JP | 2003120651 A | * | 4/2003 |
| JP | 2003294026 A | * | 10/2003 |
| JP | 2004176780 A | * | 6/2004 |
| JP | 2004213981 A | * | 7/2004 |

OTHER PUBLICATIONS

Patent Abstracts of Japan, publication No. 2001-317537, publication date Nov. 16, 2001.

Patent Abstracts of Japan, publication No. 2001-124051, publication dated May 8, 2001.

Patent Abstracts of Japan, publication No. 2002-250332, publication date Sep. 6, 2002.

Patent Abstracts of Japan, publication No. 2001-193727, publication dated Jul. 17, 2001.

* cited by examiner

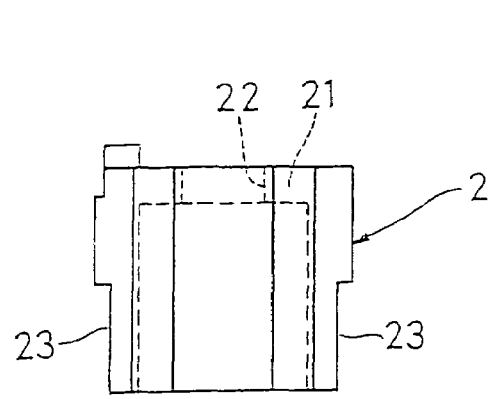
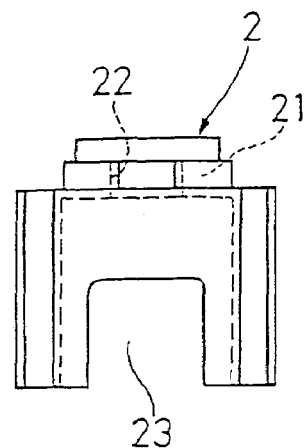
FIG. 8(A)    FIG. 8(B)
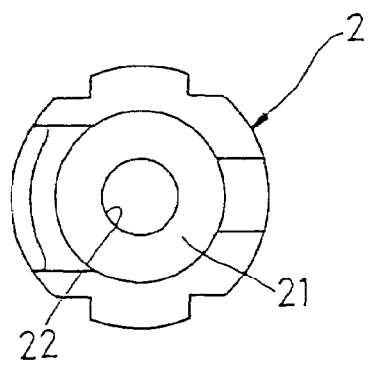
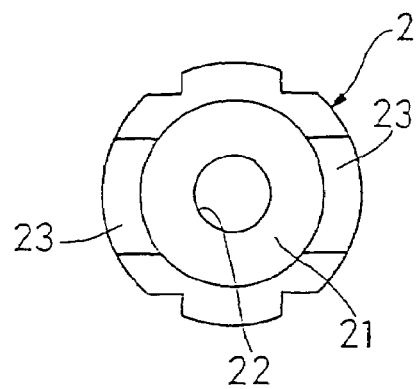
FIG. 8(C)    FIG. 8(D)
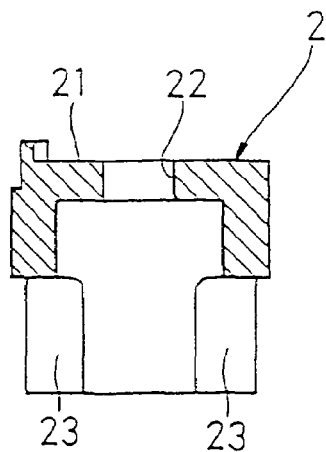
FIG. 8(E)

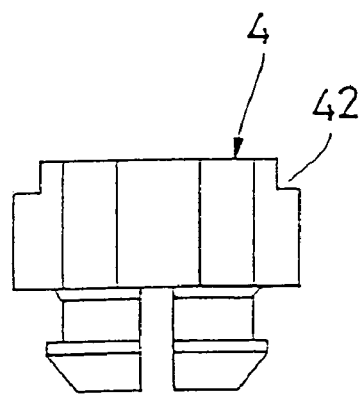
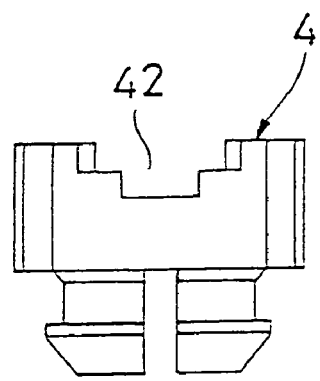
FIG. 9(A)    FIG. 9(B)
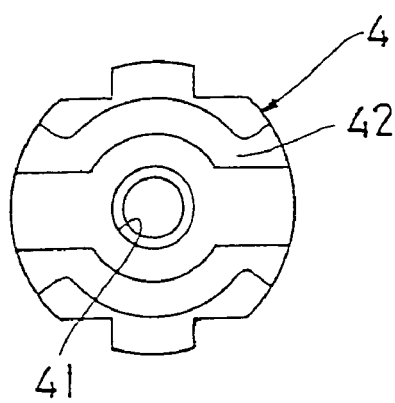
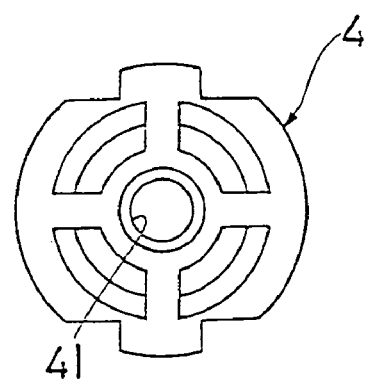
FIG. 9(C)    FIG. 9(D)
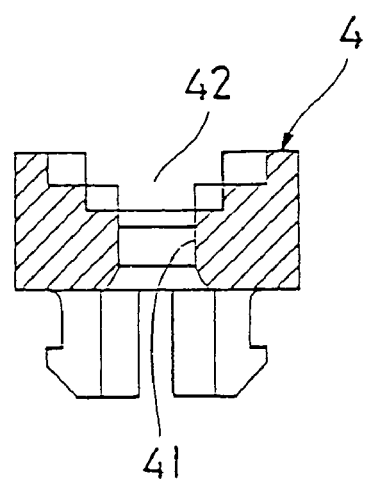
FIG. 9(E)

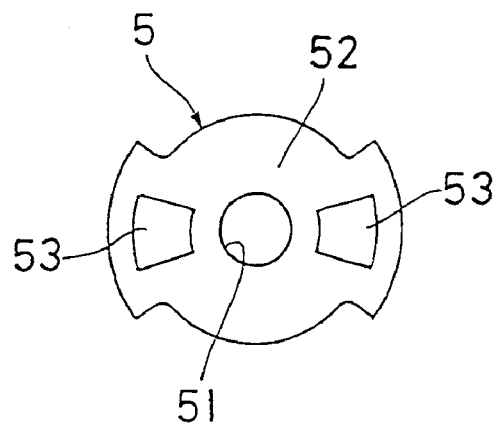
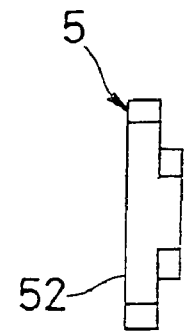
FIG. 10(A)
FIG. 10(B)
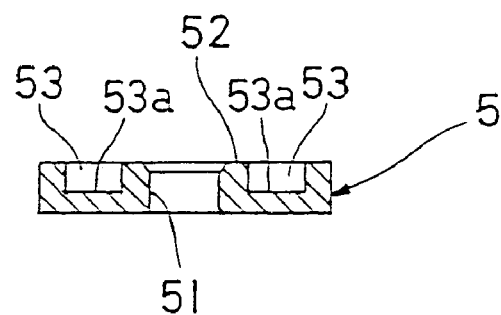
FIG. 10(C)
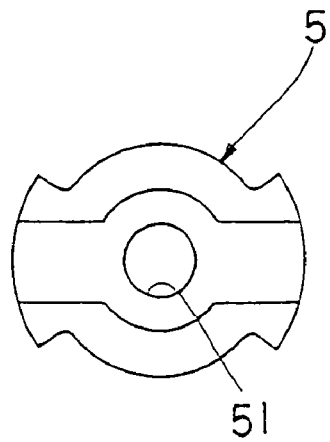
FIG. 10(D)

HINGE DEVICE

TECHNICAL FIELD

This invention relates to a hinge device suited to be used for a cellular telephone, a notebook type personal computer and the like.

BACKGROUND ART

In general, a cellular telephone includes, as shown in FIGS. 18 and 19, a transmission section A and a reception section B. The transmission section A and the reception section B are turnably connected to each other through a hinge device (not shown). The turning range of the transmission section A and the reception section B is restricted between a folding position as shown in FIG. 18 where the transmission section A and the reception section B are abutted with each other and a using position as shown in FIG. 19, when an angle formed between the transmission section A and the reception section B is, for example 170 degrees.

A hinge device used in the above-mentioned cellular telephone includes, as described, for example, in Japanese Patent Application Laid-Open Nos. 2001-193727 and 2002-106544, a first and a second hinge member which are arranged opposite to each other. The first hinge member is fixed to either the transmission section A or the reception section B of the cellular telephone, and the second hinge member is fixed to the other. The first and second hinge members are turnably connected to each other through a hinge pin. As a result, the transmission section A and the reception section B of the cellular telephone are turnably connected to each other through the hinge device.

The hinge device includes a movable member C and a fixing member D shown in FIG. 20. The movable member C connected to the first hinge member such that the movable member C is non-tunable but movable in the axial direction of the hinge pin. The movable member C is abutted with the fixing member D by a coiled spring (not shown).

A pair of projections C1, C2 are formed on an abutment surface of the movable member C with respect to the fixing member D, and a pair of recesses D1, D2 are formed on an abutment surface of the fixing member D with respect to the movable member C. The pair of projections C1, C2 are arranged such that when the reception section B is located in a position within a predetermined range of angle (biasing angle range) between a folding position and a position away by an angle α toward a using position side from the folding position, the pair of projections C1, C2 are inserted in one end parts of the recesses D1, D2, respectively, in the peripheral direction of the fixing member D. When the projections C1, C2 are inserted in the one end parts of the recesses D1, D2, respectively, the projections C1, C2 are abutted with the slanted bottom surfaces (cam surfaces) of the recesses D1, D2, respectively. By this, the biasing force of the coiled spring is converted into a turn biasing force in one direction (the direction as indicated by an arrow of FIG. 18). By this turn biasing force in one direction, the movable member C is turn biased with respect to the fixing member D and the reception section B is turned to the folding position. Then, the reception section B is maintained in the folding position. When the reception section B is located in the predetermined range of angle (biasing angle range) between a position away by an angle β from the folding position and the using position, the pair of projections C1, C2 are inserted in the other end parts of the recesses D2, D1, respectively, in the peripheral direction of the fixing member D and abutted with the bottom surfaces of the other end parts of the recesses D2, D1, respectively. The bottom surfaces of the other end parts of the recesses D1, D2 are inclined in the direction opposite to the bottom surfaces of one end parts of the recesses D1, D2. Accordingly, when the projections C1, C2 are abutted with the bottom surfaces of the other end parts of the recesses D2, D1, respectively, the biasing force of the coiled spring is converted to a turn biasing force in the other direction (direction as indicated by an arrow of FIG. 19). By this turn biasing force in the other direction, the reception section B is turned to the using position and held in the using position.

If the angle formed between the movable member C and the fixing member D is represented by θ, in the range of angle of $\alpha<\theta<\beta$, i.e., in the outside of the biasing angle range, the projections C1, C2 are pressed against the fixing member D under the biasing force of the coiled spring, and a frictional resistance is generated therebetween. By this frictional resistance, the movable member C and the fixing member D are stopped at arbitrary positions, and the transmission section A and the reception section B are stopped at arbitrary positions.

The frictional resistance generated between the projections C1, C2 and the fixing member D is comparatively small corresponding to the small biasing force of the coiled spring. For this reason, there is such a problem that it is difficult to keep the transmission section A and the reception section B in the stopping positions stably. To cope with this problem, there can be contemplated that the fraction resistance which is to be generated between the projections C1, C2 and the fixing member D is increased by strengthening the biasing force of the coiled spring. However, the coiled spring is about 3 to 5 mm in diameter and about 0.5 mm in wire diameter. Therefore, there is a certain limit in increasing the biasing force of the coiled spring. If the biasing force of the coiled spring could successfully be increased, the turn biasing force of the coiled spring against the movable member C would overly increased in the biasing angle range. It gives rise to a problem that when the reception section B is turned to the folding position, the reception section B is overly strongly abutted with the transmission section A.

DISCLOSURE OF THE INVENTION

The present invention has been made in order to solve the above-mentioned problems. According to a first embodiment of the present invention, there is provided a hinge device comprising a first and a second hinge member arranged opposite to each other, a hinge pin turnably connected to the first hinge member but non-turnably connected to the second hinge member, and a turn biasing mechanism disposed between the first hinge member and the second hinge member and for turn biasing the first hinge member in one direction with respect to the second hinge member when the first hinge member is located in a predetermined biasing angle range with respect to the second hinge member, the turn biasing mechanism including a movable member disposed between the first hinge member and the second hinge member and connected to the first hinge member such that the movable member is non-turnable but movable in an axial direction of the hinge pin and a biasing means for biasing the movable member in the axial direction of the hinge pin so that the movable member is abutted with the second hinge member, one of abutment surfaces of the movable member and the second hinge member being provided with a convex part which is to be abutted with the other abutment surface, the other abutment surface being provided with a cam face which is to be abutted with the convex part when the first hinge member is located in the biasing angle range, so that biasing force of the biasing means is converted to a turn biasing force in the one direction, wherein a fitting hole is formed in the first hinge member, the hinge pin is turnably press-fitted in the fitting hole thereby generating a frictional resistance for preventing relative rotation between the first hinge member and the hinge pin, between an inner peripheral surface of the fitting hole and an outer peripheral surface of the hinge pin at least when the first hinge member is located outside the biasing angle range.

According to a second embodiment of the present invention, there is provided a hinge device comprising a first and a second hinge member arranged opposite to each other, a hinge pin turnably connected to the first hinge member but non-turnably connected to the second hinge member, and a turn biasing mechanism disposed between the first hinge member and the second hinge member and for turn biasing the first hinge member in one direction with respect to the second hinge member when the first hinge member is located in a predetermined biasing angle range with respect to the second hinge member, the turn biasing mechanism including a movable member disposed between the first hinge member and the second hinge member and connected to the second hinge member such that the movable member is non-turnable but movable in an axial direction of the hinge pin and a biasing means for biasing the movable member in the axial direction of the hinge pin so that the movable member is abutted with the first hinge member, one of abutment surfaces of the movable member and the first hinge member being provided with a convex part which is to be abutted with the other abutment surface, the other abutment surface being provided with a cam face which is to be abutted with the convex part when the first hinge member is located in the biasing angle range, so that biasing force of the biasing means is converted to a turn biasing force in the one direction, wherein a fitting hole is formed in the first hinge member, the hinge pin is turnably press-fitted in the fitting hole thereby generating a frictional resistance for preventing relative rotation between the first hinge member and the hinge pin, between an inner peripheral surface of the fitting hole and an outer peripheral surface of the hinge pin at least when the first hinge member is located outside the biasing angle range.

In the first and second embodiments of the present invention, it is preferable that the hinge pin is press-fitted in the fitting hole so that a frictional resistance for preventing relative rotation between the first hinge member and the hinge pin is normally generated between an inner peripheral surface of the fitting hole and an outer peripheral surface of the hinge pin.

The fitting hole and a part of the hinge pin which is press-fitted in the fitting hole may be each formed in a circular configuration in section, or the fitting hole may be formed in a regular square configuration in section, a part of the hinge pin which is fitted in the fitting hole may be formed in a circular configuration in section and the hinge pin may be press-fitted in the fitting hole so that an outer peripheral surface of the hinge pin is press-contacted with four sides of the fitting hole. In the alternative, it is also accepted that the fitting hole is formed in a circular configuration in section, a part of the hinge pin which is press-fitted in the fitting hole is formed in a configuration obtained by forming an arcuate surface having a radius of curvature equal to or less than the inside diameter of the fitting hole on each regular square corner part, and the hinge pin is press-fitted in the fitting hole such that each corner part composed of the arcuate surface of the hinge pin is press-contacted with an inner peripheral surface of the fitting hole.

Moreover, in the first and second embodiments of the present invention, it is also accepted that a fitting hole having a pair of mutually parallel first inner surfaces and a pair of second inner surfaces disposed between opposite end parts of the pair of first surfaces and having an interval wider than the interval between the pair of first inner surfaces is formed in the first hinge member, a fitting part having a pair of outer surfaces having an interval therebetween generally equal to an interval between the pair of first inner surfaces and a pair of arcuate surfaces disposed between opposite end parts of the pair of outer surfaces and having an outside diameter slightly larger than the interval between the pair of first inner surfaces but smaller than the interval between the second inner surfaces is formed on a part of the hinge pin which is inserted in the fitting hole, and at least when the first hinge member is located outside the biasing angle range, the pair of arcuate surfaces press-contacted respectively with the pair of first inner surfaces thereby generating a frictional resistance for preventing relative rotation between the first hinge member and the hinge pin.

BRIEF DESCRIPTION OF DRAWINGS

FIG. 8(A) is a front view showing a first hinge member used in the above embodiment.

FIG. 8(B) is a side view of the above.

FIG. 8(C) is a plan view of the above.

FIG. 8(D) is a lower surface view of the above.

FIG. 8(E) is a front sectional view of the above.

FIG. 9(A) is a front view showing a main body member of a second hinge member used in the above embodiment.

FIG. 9(B) is a sectional view of the above.

FIG. 9(C) is a plan view of the above.

FIG. 9(D) is a lower surface view of the above.

FIG. 9(E) is a side sectional view of the above.

FIG. 10(A) is a plan view showing a fixing member of the second hinge member used in the above embodiment.

FIG. 10(B) is a side view of the above.

FIG. 10(C) is a front sectional view of the above.

FIG. 10(D) is a lower surface view of the above.

BEST MODE FOR CARRYING OUT THE INVENTION

Embodiments of the present invention will be described hereinafter with reference to FIGS. 1 through 17.

Figure 18:
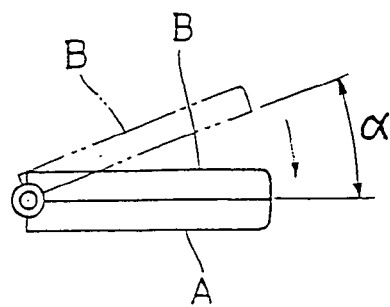
FIG. 18 is a side view showing one example of a cellular telephone, in which a hinge device according to the present invention is used, when the reception section is turned to the folding position.
Figure 19:
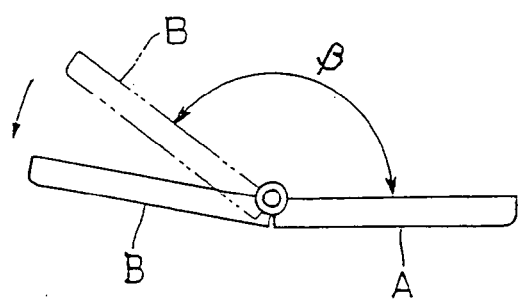
FIG. 19 is a side view showing one example of the above cellular telephone when the reception section is turned to the using position.
Figure 20:
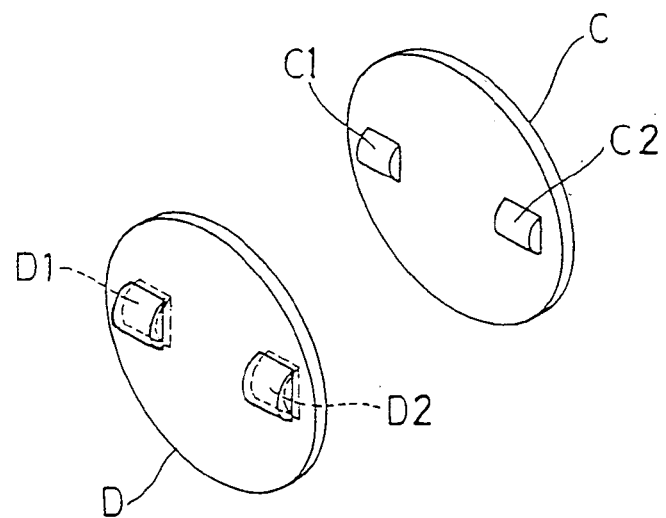
FIG. 20 is a perspective view showing a movable member and a fixing member which are used in a conventional hinge device.

FIGS. 1 through 13 show a first embodiment of the present invention. A hinge device 1 of this embodiment is used for turnably connecting, for example, a transmission section A and a reception section B of a cellular telephone shown in FIGS. 18 and 19. As shown in FIGS. 1 through 5 and 7, the hinge device 1 includes a first hinge member 2, a second hinge member 3, a hinge pin 6, a movable member 7 and a coiled spring (biasing means) 8. One of the first and second hinge members 2, 3 is non-turnably connected to the transmission section A and the other is non-turnably connected to the reception section B. In this embodiment, the first hinge member 2 is non-turnably connected to the transmission section A, and the second hinge member 3 is non-turnably connected to the reception section B. As later described, the first and second hinge members 2, 3 are turnably connected to each other through a hinge pin 6. Accordingly, the transmission section A and the reception section B are turnably connected to each other through the first and second hinge members 2, 3 and the hinge pin 6, i.e., through the hinge device 1.

As shown in FIGS. 1 through 5, 7 and 8, the first hinge member 2 is formed in a bottomed circular cylindrical configuration and has a through-hole (fitting hole) 22 of a circular configuration in section which is formed in a central part of its bottom part 21 A pair of guide grooves 23, 23 extending in an axial direction of the first hinge member 2 are formed in an end part on the opening side of the first hinge member 2.

As shown in FIGS. 1 through 5 and 7, the second hinge member 3 comprises a main body member 4 and a fixing member 5. As shown in FIGS. 1 through 5, 7 and 9, a through-hole 41 passing through the main body member 4 is formed in a central part of the main body member 4. The main body member 4 is arranged opposite to the opening side end part of the first hinge member 2 with the axis of the through-hole 41 aligned with the axis of the through-hole 22 of the first hinge member 2. An engagement concave part 42 is formed in an opposing surface of the main body member 4 with respect to the first hinge member 2. On the other hand, the fixing member 5 is formed in a plate-like configuration as shown in FIGS. 1 through 5, 7 and 10. The fixing member 5 is non-turnably inserted in the engagement concave part 42. One end face 52 of the fixing member 5 is confronted with the first hinge member 2. The other end face of the fixing member 5 is abutted with a bottom surface of the engagement concave part 42. A through-hole 51 with its axis aligned with the axis of the through-hole 41 is formed in a central part of the fixing member 5.

Figure 5:
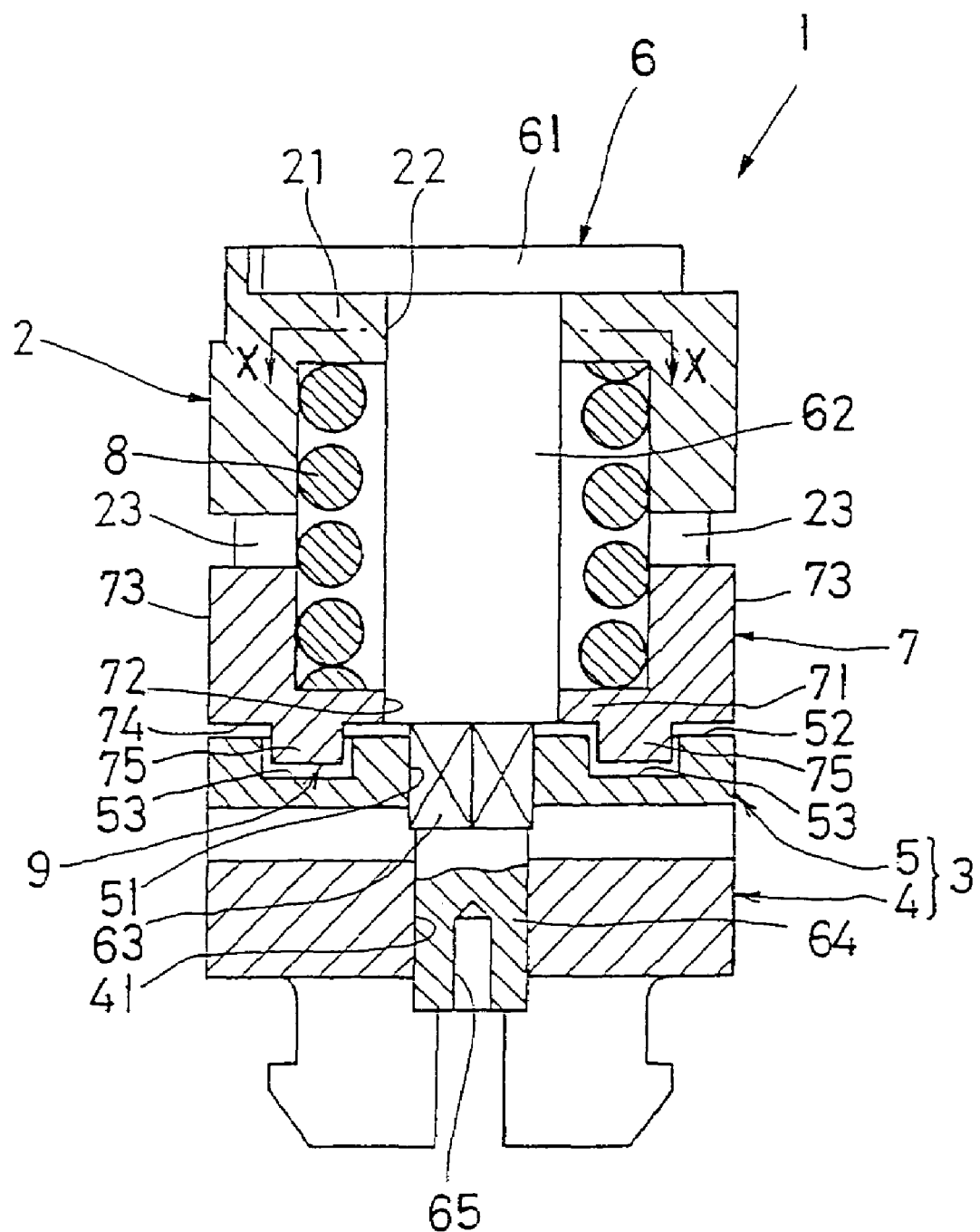
FIG. 5 is a front sectional view of the above embodiment.
Figure 7:
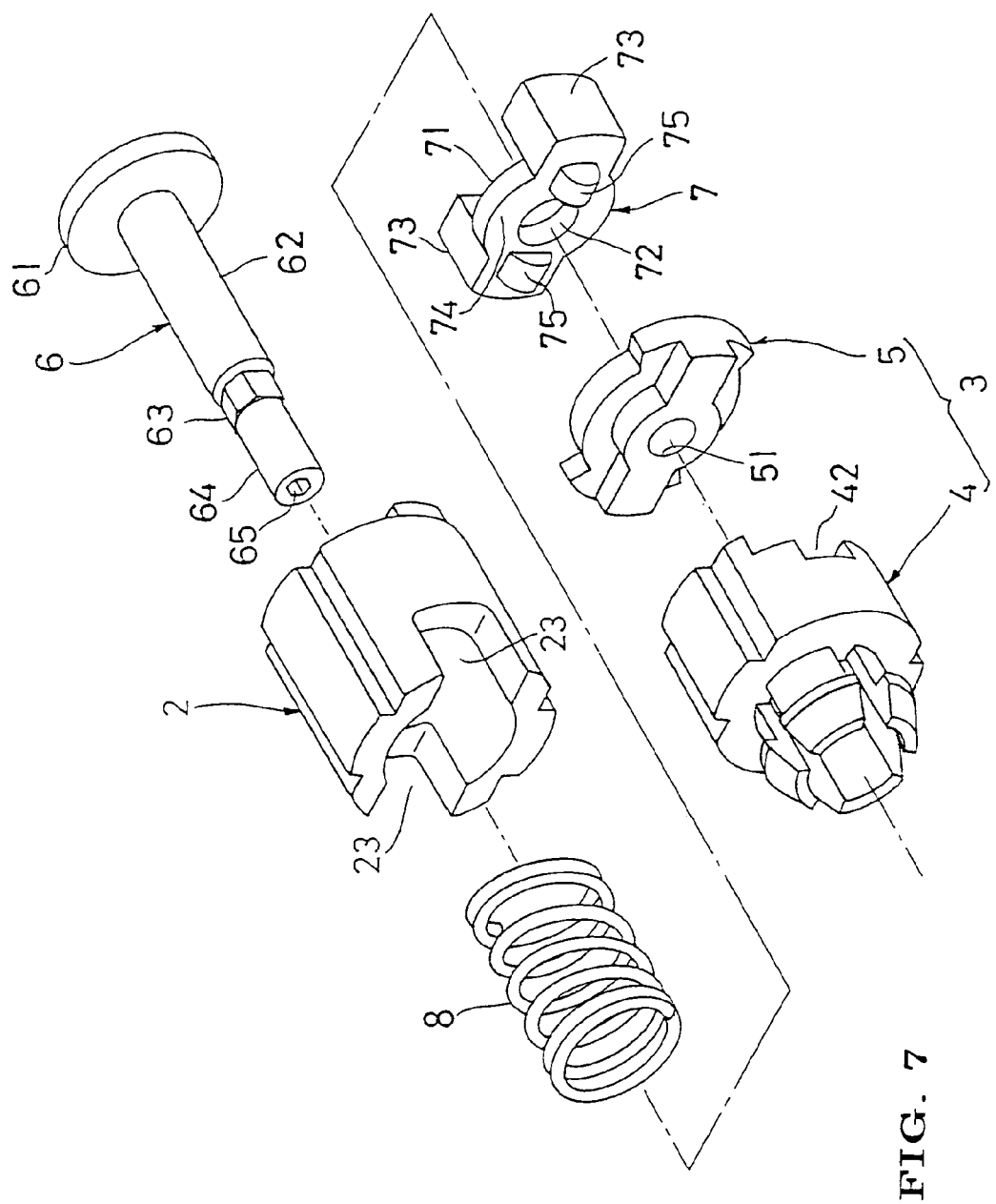
FIG. 7 is an exploded perspective view of the above embodiment.
Figure 11A:
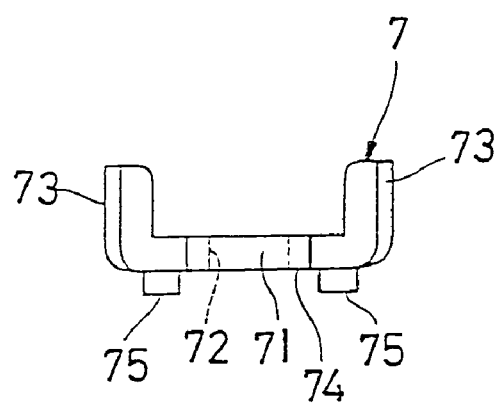
FIG. 11(A) is a front view showing a movable member used in the above embodiment.
Figure 11B:
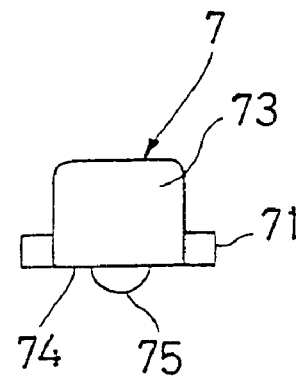
FIG. 11(B) is a side view of the above.
Figure 11C:
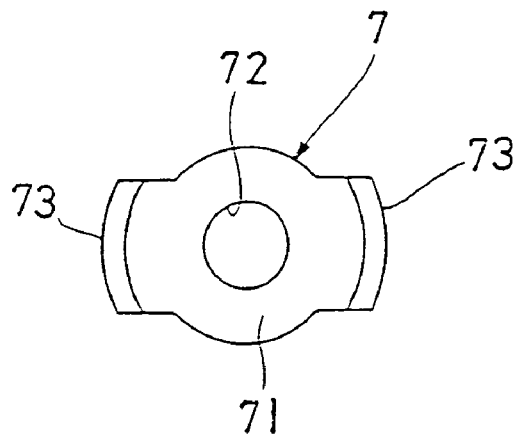
FIG. 11(C) is a plan view of the above.
Figure 11D:
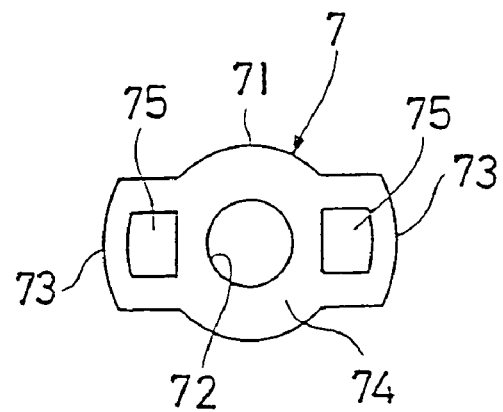
FIG. 11(D) is a lower surface view of the above.
Figure 11E:
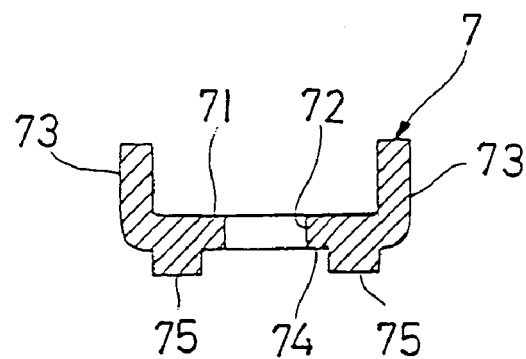
FIG. 11(E) is a front sectional view of the above.

The hinge pin 6 includes, as shown in FIGS. 5 and 7, a head part 61, an enlarged-diameter shaft part 62, a fixing shaft part 63 having a polygonal configuration in section, and a reduced-diameter shaft part 64. Those various parts each has a circular configuration in section excepting the fixing shaft part 63, and they are formed such that their axes are aligned with one another. The enlarged-diameter shaft part 62 is turnably inserted in the through-hole 22 of the first hinge member 2, and the head part 61 is abutted with the bottom part 21 of the first hinge member 2. Accordingly, the first hinge member 2 is non-movable with respect to the hinge pin 6 in a direction toward the bottom part 21 side from its opening side end part.

The fixing shaft part 63 of the hinge pin 6 is non-turnably press-fitted in the through-hole 51 of the fixing member 5. By this, the fixing member 5 is non-turnably connected to the hinge pin 6. As a result, the main body member 4 is also non-turnably connected to the hinge pin 6, and the second hinge member 3 is entirely non-turnably connected to the hinge pin 6. One end face 52 of the fixing member 5 facing the first hinge member 2 side is abutted with the end face of the enlarged-diameter shaft part 62 of the hinge pin 6. Accordingly, the second hinge member 3 is non-movably connected to the hinge pin 6 in a direction toward the head part 61 side. Moreover, the reduced-diameter shaft part 64 of the hinge pin 6 is inserted in the through-hole 41 of the main body member 4. Thus, by caulking the reduced-diameter shaft part 64 utilizing a hole 65 formed in the end face of the reduced-diameter shaft part 64, the main body member 4 is non-movably connected to the reduced-diameter shaft part 64 in a direction toward its tip side. As a result, the second hinge member 3 is connected to the hinge pin 6 such that the second hinge member 3 is non-movable in is axial direction and non-turnable. In other words, the second hinge member 3 is fixed to the hinge pin 6.

The movable member 7 is, as shown in FIGS. 1 through 5, 7 and 11, arranged between the first hinge member 2 and the fixing member 5 of the second hinge member 5. The movable member 7 includes a flat plate part 71. A through-hole 72 passing through the flat plate part 71 is formed in a central part of the flat plate part 71. The enlarged-shaft part 62 of the hinge pin 6 is inserted in this through-hole 72 such that the enlarged-shaft part 62 is movable in its axial direction and turnable. Guide parts 73, 73 extending in parallel to the axis of the through-hole 72 are formed on one side part and the other side part of the flat plate part 71. The guide parts 73, 73 are inserted in the guide grooves 23, 23 of the first hinge member 2, respectively such that the guide parts 73, 73 are non-turnable but slidable. By this, the movable member 7 is connected to the first hinge member 2 such that the movable member 7 is non-turnable but movable in the axial direction of the hinge pin 6.

As shown in FIGS. 5 and 7, a coiled spring 8 is arranged between the inner peripheral surface of the first hinge member 2 and the outer peripheral surface of the enlarged-diameter shaft part 62 of the hinge pin 6. One end part of this coiled spring 8 is abutted with the bottom part 21 of the first hinge member 2, and the other end part is abutted with the flat plate part 71 of the movable member 7. Accordingly, the coiled spring 8 presses the first hinge member 2 against the head part 61 of the hinge pin 6 and biases the movable member 7 toward the second hinge member 3 side and presses the movable member 7 against one end face 52 of the fixing member 5.

As shown in FIGS. 3, 5, 7 and 11, one end face 74 of the movable member 7 which is pressed against one end face 52 of the fixed member 5, is provided with a pair of convex parts 75, 75. The pair of convex parts 75, 75 are symmetrically arranged with respect to the through-hole 72. The convex part 75 extends in a direction orthogonal to the axis of the through-hole 72, and exhibits, as shown in FIG. 11(B), a semi-circular configuration when viewed in a direction orthogonal to the axis of the through-hole 72. The convex part 75 may be formed separately from the movable member 7. For example, it is accepted that a spherical member is embedded in the movable member 7 with a part of the spherical member projecting from one end face 74 of the movable member 74 and a part of the spherical member projecting from one end face is formed in a convex part.

Figure 1:
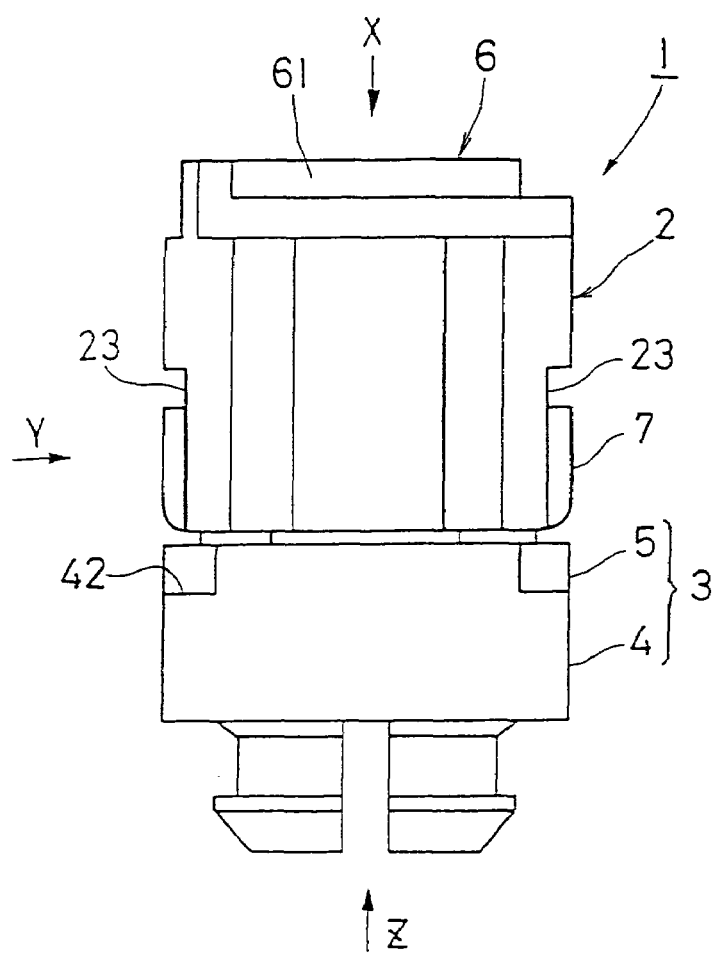
FIG. 1 is a front view showing a thirst embodiment of the present invention.
Figure 2:
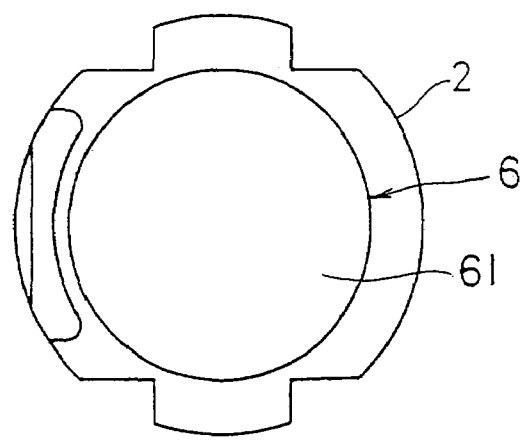
FIG. 2 is a view when viewed in a direction as indicated by an arrow X of FIG. 1.
Figure 3:
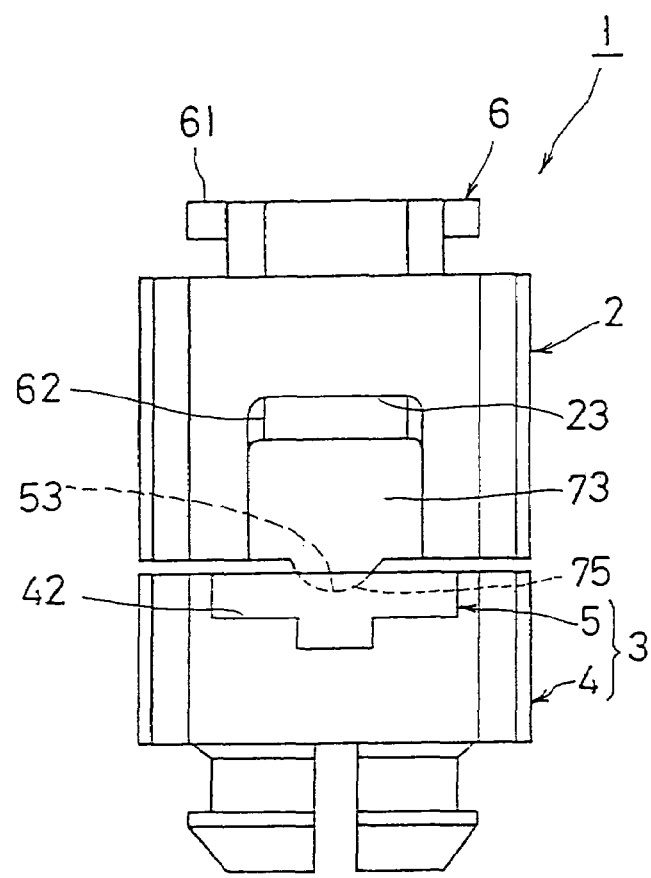
FIG. 3 is a view when viewed in a direction as indicated by an arrow Y of FIG. 1.
Figure 4:
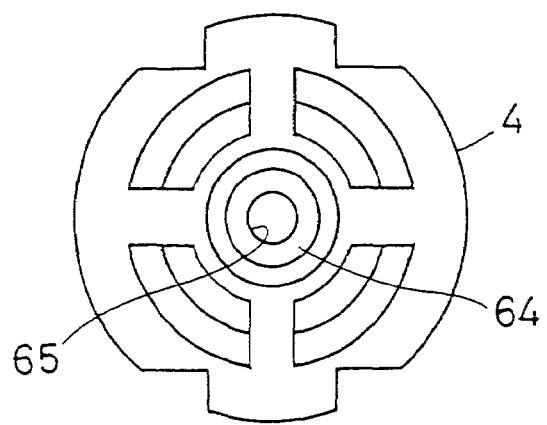
FIG. 4 is a view when viewed in a direction as indicated by an arrow Z of FIG. 1.
Figure 12:
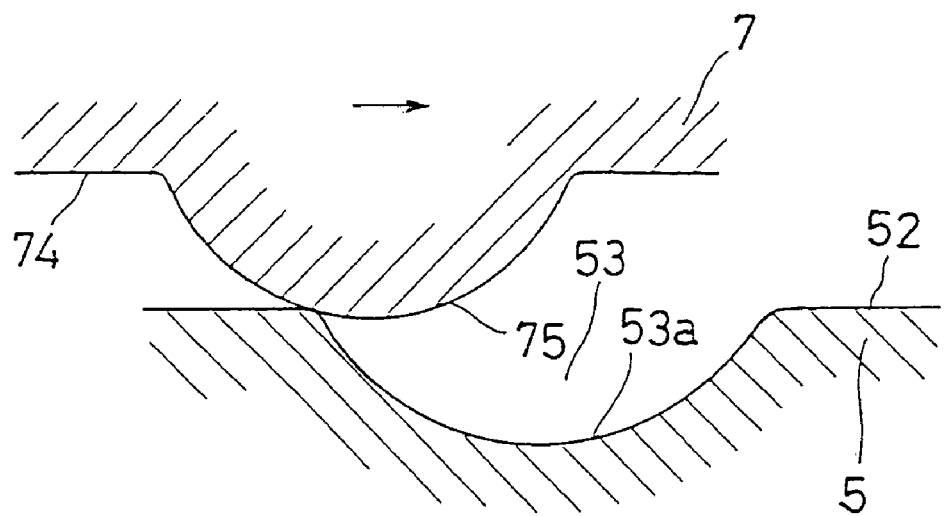
FIG. 12 is an enlarged sectional view showing a positional relationship between a convex part and a concave part when a reception section of a cellular telephone, in which the hinge of the above embodiment is used, is located in a position away by angle $\alpha$ from the folding position.
Figure 13:
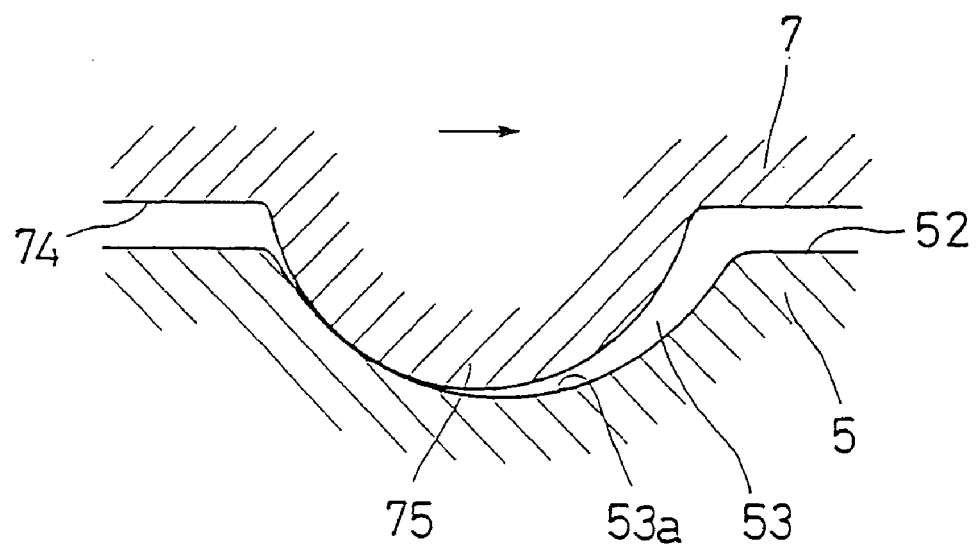
FIG. 13 is an enlarged sectional view showing a positional relationship between the convex part and the concave part when the reception part of the cellular telephone, in which the hinge of the above embodiment is used, is located in the folding position.

As shown in FIGS. 3 and 10, one end face 52 of the fixing member 5 which is pressed against the movable member 7, is provided with a pair of concave parts 53, 53. The pair of concave parts 53, 53 are symmetrically arranged with respect to the axis of the through-hole 51. As shown in FIGS. 12 and 13, a bottom surface (cam face) 53a of the concave part 53 is constituted of an arcuate surface which is orthogonal to the axis of the through-hole 51, and the depth of the concave part 53 is set to be smaller than the radius of the annular surface which constitutes the bottom surface 53a. The concave part 53 is arranged such that when the reception section B is located in a predetermined biasing angle range (hereinafter referred to as the "first biasing angle range") between the folding position and a position which is away therefrom by an angle α toward the using position side, the convex part 75 is abutted with the bottom surface 53a of the concave part 53. That is, when the reception section B is located in a position which is away by an angle α from the folding position, a place which is slightly away from the center of the convex part 75 is, as shown in FIG. 12, abutted with an intersection part between the bottom surface 53a and the end face 52. When the reception section B is turned from the position which is away by an angle α toward the folding position side, a side part of the convex part 75 is abutted with an inclined side part of the bottom surface 53a and when the reception section B is located in the folding position, it is brought into a state shown in FIG. 13. Accordingly, when the reception section B is located in the first biasing angle range, the biasing force of the coiled spring 8 is converted to a turn biasing force directing in a direction as indicated by an arrow of FIGS. 12 and 13 (one direction). By this turn biasing force direction in one direction, the second hinge member 3 is relatively turn-biased in the direction as indicated by the arrow with respect to the first hinge member 2 and thus, the reception section B is turn-biased toward the folding position. Then, the reception section B is turned to the folding position and held in that position.

When the reception section B is located in a position which is away by angle β from the folding position, the convex part 75 is located in a position which is laterally symmetric with the position shown in FIG. 12 with respect to the concave part 53, and when the reception section B is located in the using position, the convex part 75 is located in a position which is laterally symmetric with the position shown in FIG. 13 with respect to the concave part 53. Accordingly, when the reception section B is located in a predetermined biasing angle range (hereinafter referred to as the "second biasing angle position") between the position which is away by an angle β from the folding position and the using position, the biasing force of the coiled spring 8 is converted to a turn biasing force directing in a direction (the other direction) which is reverse to the direction indicated by the arrow of FIGS. 12 and 13. By this turn-biasing force directing in the other direction, the reception section B is turned to the using position and held in the using position.

The bottom surface 53a serving as a cam face may be an inclined planar surface or a convexly curved surface.

As apparent from the foregoing, in the hinge device 1 of this embodiment, a turn biasing mechanism 9 is constituted by a convex part 75 formed on the movable member 7, the bottom surface 53a of the concave part 53 formed in the fixing member 5 and the coiled spring 8. The angle obtained by subtracting the angle β from the angle formed between the transmission section A and the reception section B when the reception section B is located in the using position is set to be equal to the angle α. Those angles may be set to be different from each other.

Figure 6:
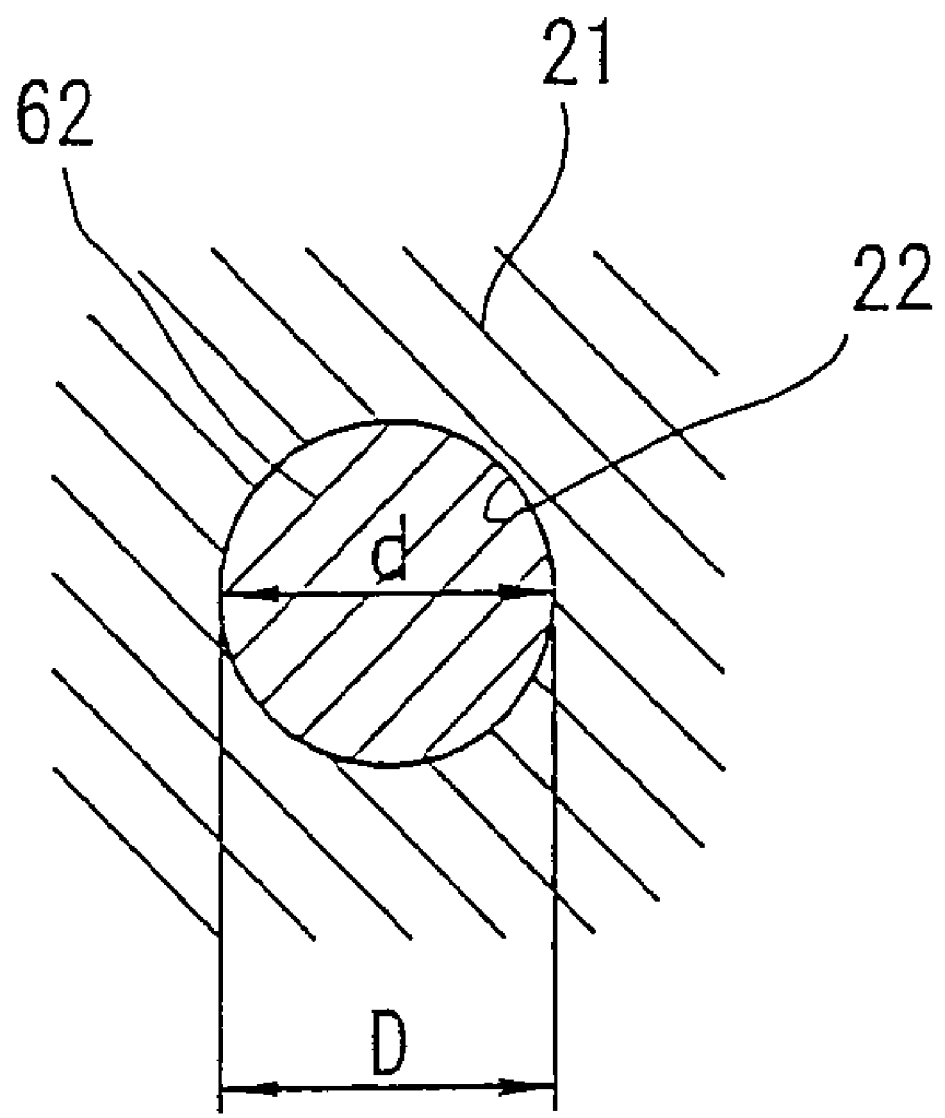
FIG. 6 is a sectional view taken on line X-X of FIG. 5.

As shown in FIG. 6, in case the inside diameter of the through-hole 22 of the first hinge member 2 is represented by d and the outside diameter of the enlarged-diameter shaft part 62 of the hinge pin 6 is represented by D, the outside diameter D is set to be larger, though slightly (for example, several μm), than the inside diameter d as expressed by D>d. Accordingly, the enlarged-diameter shaft part 62 is turnably press-fitted in the through-hole 22. As a result, when the first hinge member 2 and the hinge pin 6 are relatively turned, a frictional resistance for preventing relative rotation between the first hinge member 2 and the hinge pin 6 is generated between the inner peripheral surface of the through-hole 22 and the outer peripheral surface of the enlarged-diameter shaft part 62. Since the hinge pin 6 is non-turnably connected to the second hinge member 3, this frictional resistance acts as a turn resisting force for preventing relative rotation between the first hinge member 2 and the second hinge member 3. In case this turn resisting force is represented by F1, the turn biasing force caused by the coiled spring 8 when the reception section B is located in the first biasing angle range is represented by F2 and the turn biasing force caused by the coiled spring 8 when the reception section B is located in the second biasing angle range is represented by F3, the inside diameter d of the through-hole 22 and the outside diameter D of the enlarged-diameter shaft part 62 are determined such that the following expressions can be established.

F1<F2, F1<F3

The turn biasing forces F2, F3 are actually obtained by subtracting the frictional resistance generated between the convex part 75 and the bottom surface 53a from the turn biasing force caused by the coiled spring and converted under the effect of the convex part 75 and the bottom surface 53a.

In a cellular telephone turnably connected through the hinge device 1 thus constructed, when the reception section B is located in the first biasing angle position or in the second biasing angle range, the coiled spring 8 turn-biases the reception section B toward the folding position side or using position side with respect to the transmission section A. On the other hand, the frictional resistance acting between the inner peripheral surface of the through-hole 22 and the outer peripheral surface of the enlarged-diameter shaft part 62 prevents relative rotation of the reception section B with respect to the transmission section A. Since F1<F2, F1<F3 are established, the reception section B is turned to the folding position or using position by the coiled spring 8 and held in that position.

When the angle formed between the transmission section A and the reception section B is larger than the angle α but smaller than the angle β, in other words, when the reception section B is located outside the first and second biasing angle ranges (hereinafter referred to as the "stoppable range"), the frictional resistance generated between the inner peripheral surface of the through-hole 22 of the first hinge member 2 and the outer peripheral surface of the enlarged-diameter shaft part 62 of the hinge pin 6 acts as a force for preventing relative rotation between the transmission section A and the reception section B, in addition to the frictional resistance generated between the convex part 75 of the movable member 7 and the end face 52 of the fixing member 5. Accordingly, in the stoppable range, the transmission section A and the reception section B can be stopped with force which is greater by a portion equal to the frictional resistance acting between the inner peripheral surface of the through-hole 22 and the outer peripheral surface of the hinge pin 6 compared with a case wherein the transmission section A and the reception section B are stopped only by the frictional resistance generated between the projection 75 and the end face 52. Thus, the transmission section A and the reception section B can stably be stopped.

Figure 14:
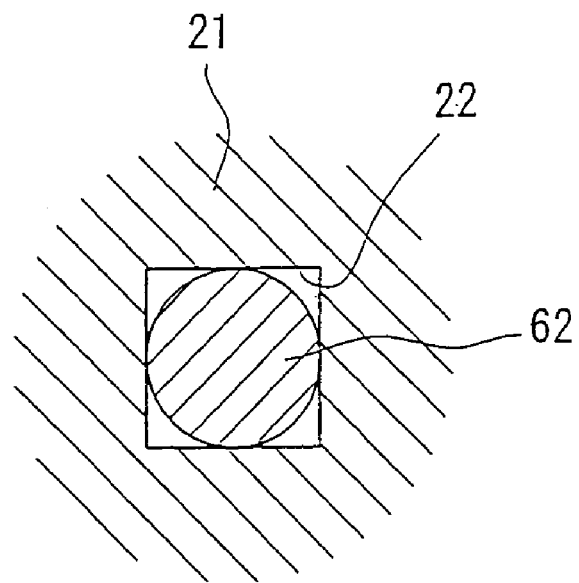
FIG. 14 is a sectional view, like FIG. 6, showing a second embodiment of the present invention.

FIG. 14 shows a second embodiment of the present invention. In this embodiment, the through-hole 22 of the first hinge member 2 is formed in a regular square configuration in section. The lengths of the respective sides of the through-hole 22 are set to be slightly smaller than the outside diameter of the enlarged-diameter shaft part 62. As a result, the enlarged-diameter shaft part 62 is press-fitted in the through-hole 22 and the outer peripheral surface of the enlarged-diameter shaft part 62 is press-contacted with the four sides of the through-hole 22. By the frictional resistance acting between the outer peripheral surface of the enlarged-diameter shaft part 62 and the four sides of the through-hole 22, the reception section B is stably stopped in the stoppable range.

Figure 15:
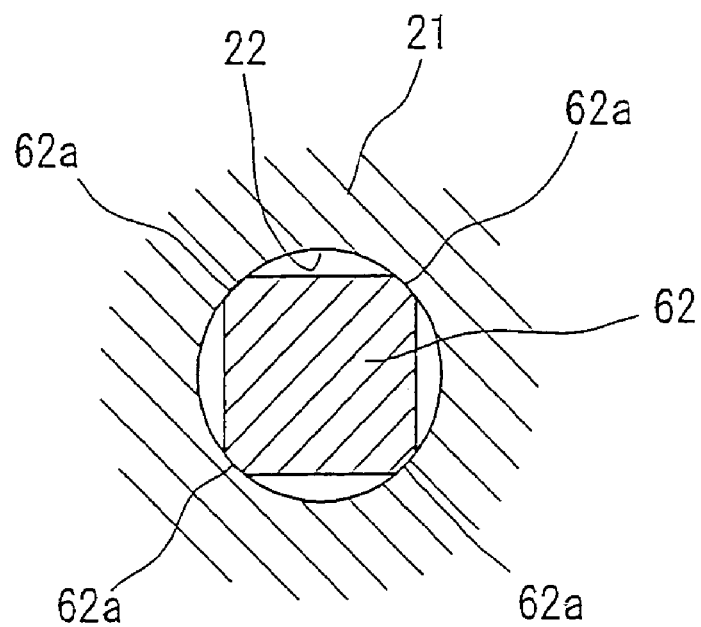
FIG. 15 is a sectional view, like FIG. 6, showing a third embodiment of the present invention.

FIG. 15 shows a third embodiment of the present invention. In this embodiment, at least a part of the enlarged-diameter shaft part 62 fitted to the through-hole 22 is formed in a generally regular square configuration in section. An arcuate part 62a is formed on each of the four corner parts of that particular part of the enlarged-diameter shaft part 62. The interval between two arcuate parts 62a, 62a located on a diagonal line is set to be slightly larger than the inside diameter of the through-hole 22. By this, the enlarged-diameter shaft part 62 is press-fitted in the through-hole 22 and the four arcuate parts 62a of the enlarged-diameter shaft part 62 are press-contacted with the inner peripheral surface of the through-hole 22. The radius of curvature of the arcuate part 62a is set to be equal to or less than the radius (=d/2) of the through-hole 22 so that the opposite end parts of the arcuate part 62 will not bite into the through-hole 22.

Figure 16:
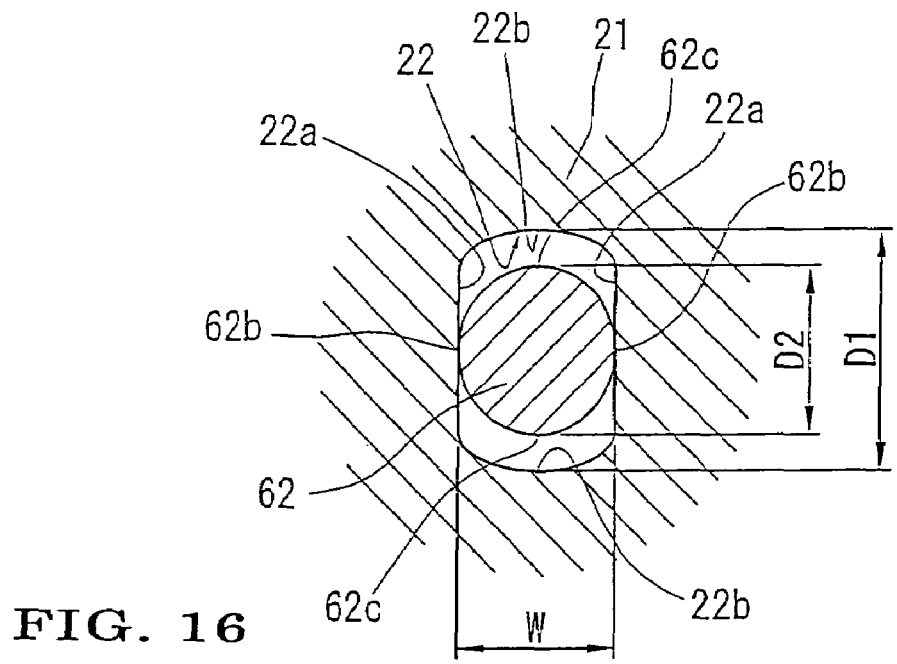
FIG. 16 is a sectional view, like FIG. 6, showing a fourth embodiment when a reception section is in the folding position.
Figure 17:
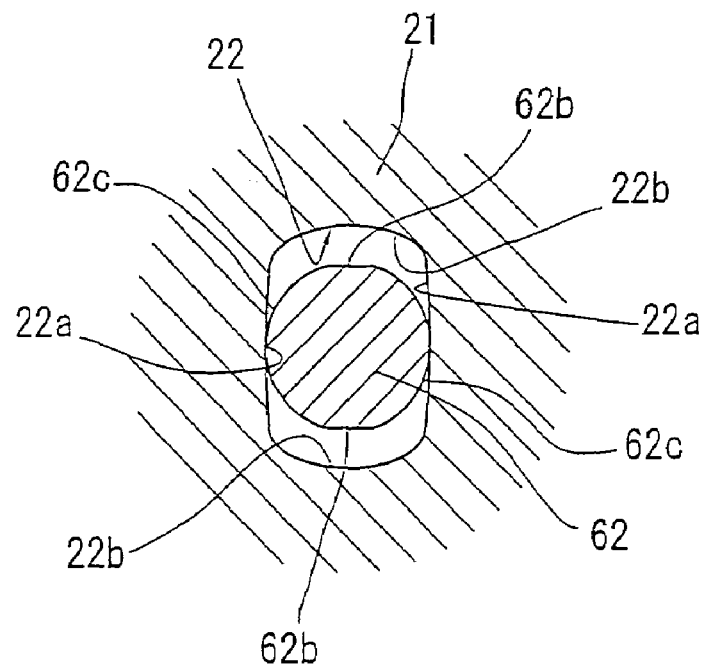
FIG. 17 is a sectional view, like FIG. 6, showing the above embodiment when the reception section is turned by about 90 degrees from the folding position toward the using position.

FIGS. 16 and 17 show a fourth embodiment of the present invention. In this embodiment, the through-hole 22 is formed in an elliptical configuration and it includes two parallel planar surface parts (first inner surface) 22a, 22a, and a pair of arcuate parts (second inner surface) 22b, 22b formed between the end parts of the planar surface parts 22a, 22a. In case the interval between the planar surface parts 22a, 22a is represented by W and the inside diameter of the arcuate parts 22b, 22b is represented by D1, the interval W and the inside diameter D1 are set such that D1>W is satisfied. The enlarged-diameter shaft part 62 is also formed in an elliptical configuration in section, and it includes mutually parallel two planar surface parts (outer surface) 62b, 62b and a pair of arcuate surface parts 62c, 62c formed between the end parts of the planar surface parts 62b, 62b. The interval between the planar surface parts 62b, 62b is set to be equal to the interval W between the planar surface parts 22a, 22a. The outside diameter D2 of the arcuate surfaces 62c, 62c is set to be slightly (about several μm) larger than the interval W but smaller than the inside diameter D1. The phase between the through-hole 22 and the enlarged-diameter shaft part 62 is determined such that when the reception section B is located in the folding position, as shown in FIG. 16, the planar surface parts 22a, 62b are mutually surface contacted, and when the reception section B is located in a position other than the folding position, as shown in FIG. 17, the arcuate surface 62c is contacted with the planar surface parts 22a. The phase between the through-hole 22 and the enlarged-diameter shaft part 62 may be determined such that in case the angle between the folding position and the using angle is represented by θ (<180 degrees), the angle formed between the planar surface part 22a and the planar surface part 62b becomes (180−θ)/2 when the reception section B is located in the folding position. In that case, the phase between the through-hole 22 and the enlarged-diameter shaft part 62 when the reception section B is located in the folding position is symmetrical with the phase between the through-hole 22 and the enlarged-diameter part 62 when the reception section B is located in the using position with reference to a line bisecting the arcuate part 22b of the through-hole 22.

It should be noted that the present invention is not limited to the above-mentioned embodiments but that many changes and modifications can be made in accordance with necessity.

For example, in the above-mentioned embodiments, the hinge device according to the present invention is used for a cellular telephone. Instead, the hinge device according to the present invention can likewise be applied to a notebook type personal computer, etc.

Moreover, in the above-mentioned embodiments, the movable member 7 is connected to the first hinge member 2 such that the movable member 7 is non-turnable but movable. Instead, the movable member 7 may be connected to the second hinge member 3 such that the movable member 7 is non-turnable but movable. In that case, the movable member 7 is abutted with the first hinge member 2 by the coiled spring 8, and a convex part is formed on one of the abutment surfaces of the movable member 7 and the first hinge member 2, and a concave part whose bottom surface serves as a cam face is formed in the other abutment surface.

Moreover, in the above-mentioned embodiments, the second hinge member 3 is constituted by the main body member 4 and the fixing member 5 which are separately formed. Instead, it is accepted that the main body member 4 and the fixing member 5 are integrally formed, and the second hinge member 3 is entirely integrated.

Moreover, in the above-mentioned embodiments, the angle range between the folding position and a position which is away by an angle α from the folding position, and the angle range between a position which is away by an angle β from the folding position and the using position, are referred to as the biasing angle range. Instead, only one of the angle ranges may be referred to as the biasing angle range.

INDUSTRIAL APPLICABILITY

A hinge device according to the present invention can be utilized as a hinge device for turnably connecting the transmission section and the reception section of a cellular telephone to each other or turnably connecting the keyboard section and the display section of a notebook type personal computer to each other.

The invention claimed is:

1. A hinge device comprising:
   a first hinge member;
   a second hinge member arranged opposite to the first hinge member;
   a hinge pin turnably connected to the first hinge member and non-turnably connected to the second hinge member; and
   a turn biasing mechanism configured to turn bias the first hinge member in a first direction with respect to the second hinge member when the first hinge member is in a predetermined biasing angle range with respect to the second hinge member, wherein the turn biasing mechanism comprises:
      a movable member disposed between the first hinge member and the second hinge member, wherein the movable member is non-turnably connected to the first hinge member and movable in an axial direction of the hinge pin; and
      a biasing member configured to bias the movable member in the axial direction of the hinge pin such that the movable member is abutted with the second hinge member, wherein:
         a first abutment surface of one of the movable member and the second hinge member comprises a convex part; and
         a second abutment surface of the other of the movable member and the second hinge member comprises a cam face, wherein when the first hinge member is in the biasing angle range, the cam face is abutted with the convex part such that a biasing force of the biasing member is converted to a turn biasing force in the first direction,
   wherein a fitting hole is formed in the first hinge member, and the hinge pin is turnably press-fitted in the fitting hole such that a frictional resistance of a predetermined force between an inner peripheral surface of the fitting hole and an outer peripheral surface of the hinge pin prevents relative rotation between the first hinge member and the hinge pin, at least when the first hinge member is outside the biasing angle range.

2. A hinge device according to claim 1, wherein said hinge pin is press-fitted in said fitting hole such that the frictional resistance is normally generated between the inner peripheral surface of said fitting hole and the outer peripheral surface of said hinge pin.

3. A hinge device according to claim 2, wherein said fitting hole and a part of said hinge pin which is press-fitted in said fitting hole are circular.

4. A hinge device according to claim 2, wherein said fitting hole is formed in a regular square configuration in section, a part of said hinge pin which is fitted in said fitting hole is formed in a circular configuration in section and said hinge pin is press-fitted in said fitting hole so that an outer peripheral surface of said hinge pin is press-contacted with four sides of said fitting hole.

5. A hinge device according to claim 2, wherein said fitting hole is formed in a circular configuration in section, a part of said hinge pin which is press-fitted in said fitting hole is formed in a configuration obtained by forming an arcuate surface having a radius of curvature equal to or less than the inside diameter of said fitting hole on each regular square corner part, and said hinge pin is press-fitted in said fitting hole such that each corner part composed of said arcuate surface of said hinge pin is press-contacted with an inner peripheral surface of said fitting hole.

6. A hinge device according to claim 1, wherein a fitting hole having a pair of mutually parallel first inner surfaces and a pair of second inner surfaces disposed between opposite end parts of said pair of first surfaces and having an interval wider than said interval between said pair of first inner surfaces is formed in said first hinge member, a fitting part having a pair of outer surfaces having an interval therebetween generally equal to an interval between said pair of first inner surfaces and a pair of arcuate surfaces disposed between opposite end parts of said pair of outer surfaces and having an outside diameter slightly larger than the interval between said pair of first inner surfaces but smaller than the interval between said second inner surfaces is formed on a part of said hinge pin which is inserted in said fitting hole, and at least when said first hinge member is located outside said biasing angle range, said pair of arcuate surfaces press-contacted respectively with said pair of first inner surfaces thereby generating a frictional resistance for preventing relative rotation between said first hinge member and said hinge pin.

* * * * *